(12) United States Patent
Lichtfuss

(10) Patent No.: US 6,989,916 B2
(45) Date of Patent: Jan. 24, 2006

(54) SCANNER SCREEN USING COMPUTER MONITOR AS EXTERNAL LIGHT SOURCE

(75) Inventor: Hans A. Lichtfuss, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1095 days.

(21) Appl. No.: 09/741,504

(22) Filed: Dec. 18, 2000

(65) Prior Publication Data

US 2002/0075525 A1    Jun. 20, 2002

(51) Int. Cl.
*H04N 1/04*  (2006.01)
*H05K 5/00*  (2006.01)

(52) U.S. Cl. .................. 358/474; 358/471; 358/482; 361/686; 361/683; 248/918

(58) Field of Classification Search ............... 358/475, 358/474, 471, 509, 472, 473, 482, 487, 506, 358/505; 345/104, 207; 382/312, 318, 319, 382/313; 361/686, 683, 682, 681, 679; 348/836, 348/842, 823; 248/918
See application file for complete search history.

(56) References Cited

U.S. PATENT DOCUMENTS

| 5,349,174 | A | * | 9/1994 | Van Berkel et al. | ..... 250/208.1 |
| 5,416,610 | A | * | 5/1995 | Kikinis | ..................... 358/474 |
| 5,585,817 | A | * | 12/1996 | Itoh et al. | .................. 345/104 |
| 6,131,522 | A | | 10/2000 | Chavez | ....................... 108/90 |
| 6,307,649 | B1 | * | 10/2001 | Williamson | ................. 358/474 |

\* cited by examiner

*Primary Examiner*—Cheukfan Lee

(57) ABSTRACT

A photoelectric scanner screen device wherein the object to be scanned is illuminated by light from an external light source such as a CRT of a monitor associated with a desktop computer. A scanner screen component of the device is mechanically associated with the monitor. The scanner screen component is comprised of layers of translucent material such that a document to be scanned can be positioned between a lid layer and a platen layer while the scanner screen's photodetectors are positioned between the platen layer and a rear layer. An external computer, to which the CRT is attached, will carry out the processing required for imaging the object to be scanned.

27 Claims, 8 Drawing Sheets

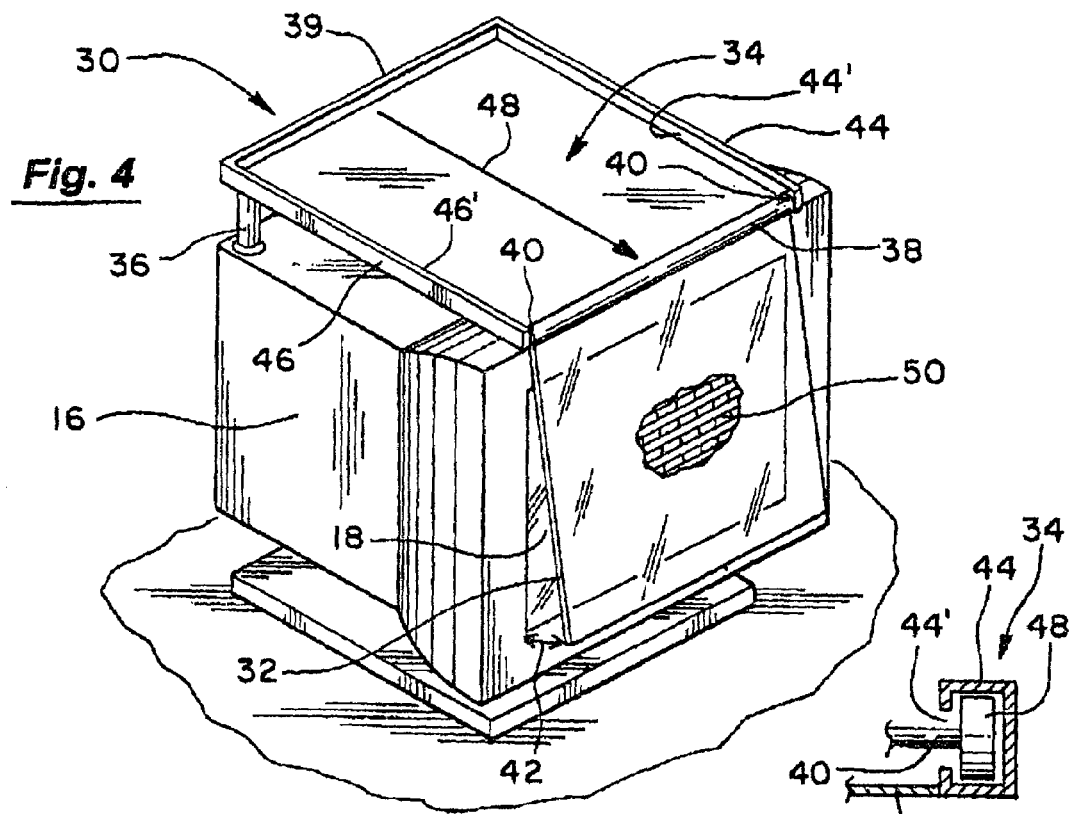
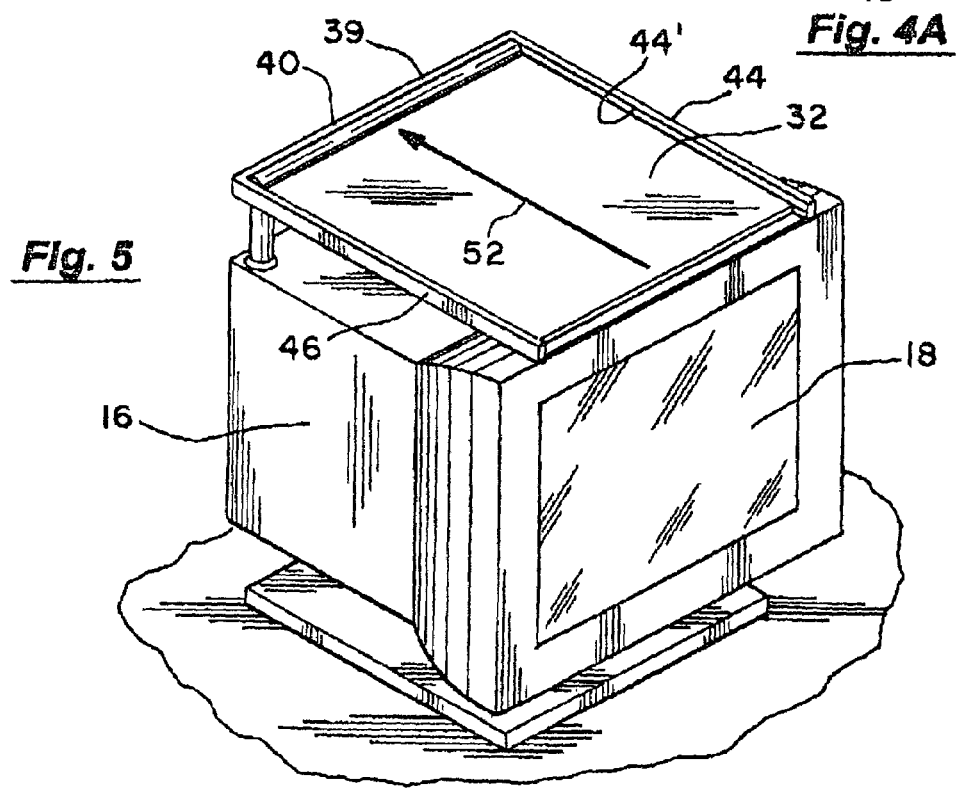

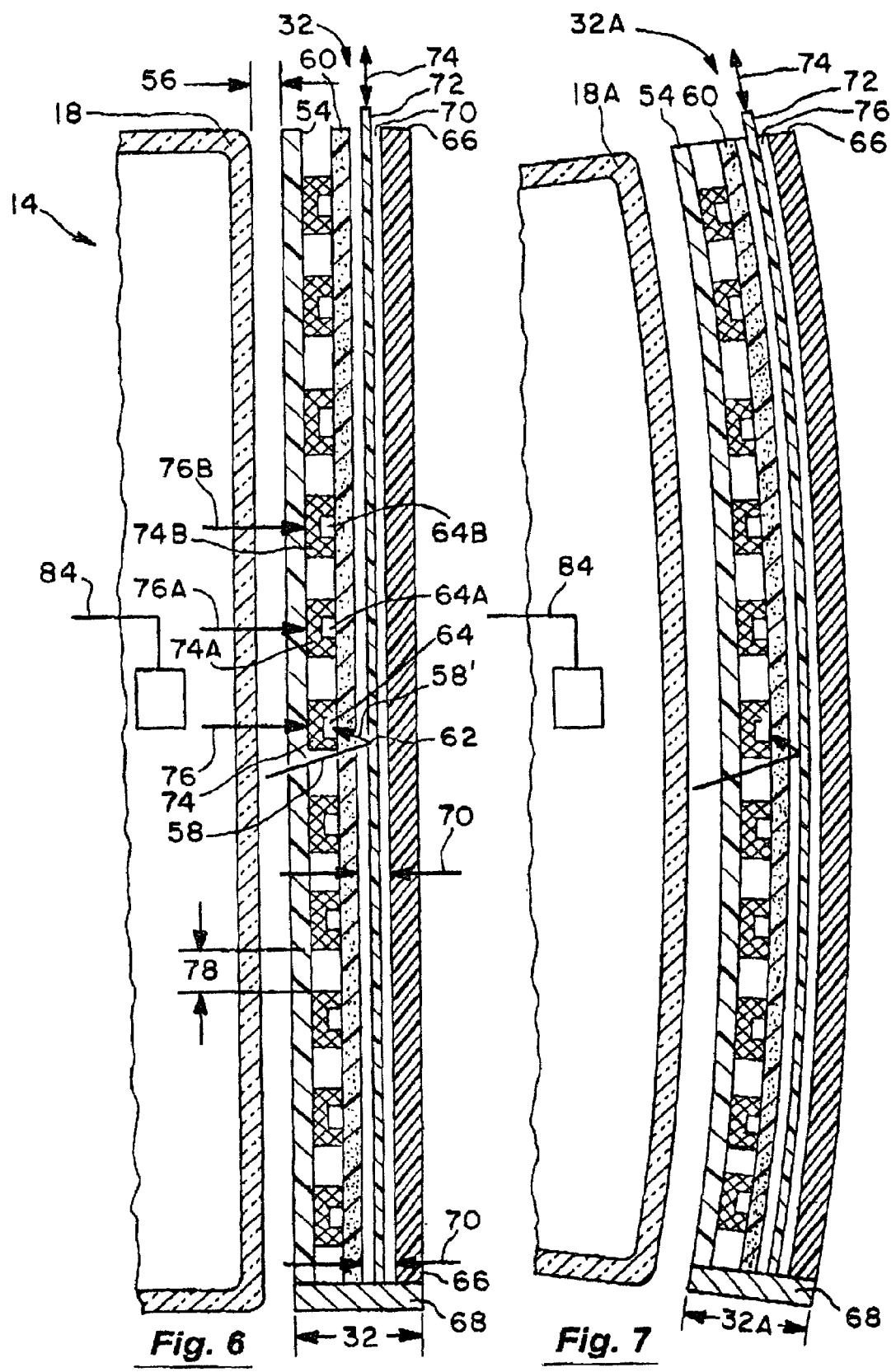

SCANNER SCREEN USING COMPUTER MONITOR AS EXTERNAL LIGHT SOURCE

BACKGROUND OF THE INVENTION

1. Field of the Invention

The present invention generally relates to electrophotographic scanners and, more particularly, to those adapted to use an external light source to illuminate an object to be scanned. For the purposes of this patent disclosure, the term "external light source" can be taken to mean a light source from a device other than the scanner itself, e.g., a cathode ray tube ("CRT") of a computer ("CPU") monitor.

As use of personal computers and their peripheral equipment has proliferated, the available space on user desktops has become extremely crowded and, hence, valuable. The term "footprint" has, in part, arisen out of concerns for conserving desktop space. Computer and peripheral equipment manufacturers have used various approaches in addressing the desktop crowding problem. These approaches have included various stacking schemes (such as stacking a monitor or printer on top of a computer's chassis), combining a mouse and a keyboard in an integral unit, providing scanners with sheet feed devices and by simply making computers and peripherals narrower and taller.

2. Description of Related Art re: Scanner Footprint Concerns

Manufacturers of scanners also have made some strides in reducing the footprints of their products. For example, scanners having automated feed mechanisms generally take up less overall desktop space than hand-fed scanners. Unfortunately, scanners having automatic feeding devices similar to those used to feed sheets of paper from a stack are not well suited to scanning photos, other fragile documents or objects considerably thicker than a sheet of paper. This unsuitability follows from the fact that photos, fragile documents and documents thicker than a sheet of paper can not be bent to the degree that a sheet of paper is bent in those scanners devoted to scanning sheets of paper that are automatically fed from a stack. Such bending would seriously damage photos or other fragile or thick documents. These circumstances have forced many scanner users to purchase, and dedicate valuable desktop space to, flatbed desktop scanners.

Scanner footprint concerns also have been addressed, in a somewhat indirect manner, by improving the portability of certain desktop scanners—namely so-called "portable" scanners. Portable scanners have been specifically designed to be highly compact in construction and very light in weight. A great deal of the cost, size and weight reductions associated with portable scanners has been achieved by limiting the number of "onboard" components required to operate them. For example, U.S. Pat. No. 5,680,375 teaches a portable scanner that employs a light source (e.g., the CRT of a video monitor unit associated with a computer), power sources, processors and data storage capabilities that are entirely external to that portable scanner. In short, portable scanner designers have sought to use whatever equipment is available in a desktop working environment. It should be understood, however, that even though many portable scanners have attached their scanner screens to the face of a computer monitor, the remainder of such portable scanners still takes up valuable desktop space. It would, therefore, be desirable to have a low cost scanner with the functionality of a flatbed scanner—without taking up the desktop space that self-contained scanners, or portable scanners, normally require.

3. Description of Related Art re: Scanning Technology

Scanning devices image an object by sequentially focusing arrays of light beams on narrow portions of that object. A portion of light reflected from the object is focused on a linear array of photosensors. A line portion of the object imaged on such a photosensor array is often referred to as a "scan line". As the light source is moved relative to the object, a plurality of scan line images is formed. In effect, this plurality of images "becomes" the object.

A portion of the linear array of photosensors corresponds to a small area on a scan line. These small areas are often referred to as "picture elements" or "pixels". The photodetectors associated with these small areas of a scan line also are often called "pixels". Be that as it may, each photodetector in such an array will respond to the light intensity produced by a pixel location on a scan line that is optically associated with that photodetector. A photodetector response is transduced into a data signal (usually a voltage signal) whose intensity is proportional to the intensity of the light that the photodetector experiences during an interval of time called a "sampling interval". A plurality of such data signals from the array of photodetectors is then processed by data processing systems well known to the electrophotography scanning arts.

SUMMARY OF THE INVENTION

The present invention employs photodetectors in ways that gain many of the advantages associated with portable scanners, but under circumstances wherein the entire scanner device (screen plus associated scanner components) takes no desktop space whatsoever. For example, the scanners of this patent disclosure do not require an onboard light source, but rather utilize light from an external source to illuminate an object to be scanned. The external light source is preferably a planar source, such as a video display or monitor of the type commonly used with desktop computers. The more preferred embodiments of applicant's invention also use those power sources, processors and data storage devices commonly available in desktop computer systems. Therefore, applicant's scanner is light enough in weight to be easily mounted on a computer monitor. This mounting may be on top of, or a side of, such a monitor. Hence, the herein disclosed scanner screen device makes no footprint whatsoever.

Applicant's scanner screen device has two major components: a scanner screen and a holder (a storage tray and/or storage frame) for storing the scanner screen when it is not in use and for positioning the screen in front of a CRT when the screen is performing its scanning function. The scanner screen component has at least three distinct layers of plastic sheet material that are employed in ways hereinafter more fully described. The optional use of a fourth layer of such a plastic sheet material also will be described. These layers of plastic sheet material can be flexible or rigid in nature. The lower cost, light weight and easy stowability of applicant's scanner screen device all follow, to some degree, from the fact that its scanner screen component is, in large part, constructed from layers of light weight, sheet-like, plastic materials that are adapted to perform two basic functions. They hold an object to be scanned (e.g., a sheet of paper) in a scanning position and they house an array of shielded photodetectors ("photodetector/shield units") in a manner such that the photodetector/shield units simultaneously prevent a large portion of the light that enters the scanner screen from a CRT from going beyond the array of photodetector/shield units while allowing other portions of light from the CRT to define an array of light paths that are used to create scan lines that are employed to image an object to be scanned.

Applicant's scanner screen component does not move during its scanning operations. Rather, it is placed in a fixed position from which it can systematically collect light from an external source (such as a CRT of a computer monitor) and then use that light to illuminate an object to be scanned. Therefore, the external light source (e.g., a CRT of a desktop computer monitor) used in conjunction with applicant's scanner device must be able to produce and emit scanning lines. Preferably this is done according to a program contained in a computer that also is associated with the CRT used as the light source for the scanner. In the more preferred embodiments of this invention, as a given scanning operation takes place, the accrual of data contained in a series of scan lines also will be processed and stored by the same external computer that is associated with the computer monitor unit being used as the scanner light source. This data can be used locally (e.g., at the user's desktop) or it may be transmitted to other locations in ways well known to the telecommunication arts. The external computer also can be used to control the spectral components emitted by the CRT. For example, the CRT can be directed to provide either a monochrome or a polychrome scan to perform more specifically tailored scanning functions.

DESCRIPTION OF THE DRAWINGS

FIG. 4 shows a left front perspective view of applicant's scanner device mounted on top of a computer monitor and wherein applicant's scanner screen is shown being swung down into its operating position in front of the monitor's CRT.

FIG. 4A is a detail view of a preferred method of mounting applicant's scanner screen to a scanner screen holding device.

FIG. 5 shows a left front perspective view of the scanner screen of this patent disclosure stowed in a tray-like and/or frame-like, scanner screen holding device.

FIG. 6 shows a cross sectional view of a scanner screen constructed and used according to the teachings of this patent disclosure.

FIG. 7 shows a cross sectional view of a scanner screen having a curved configuration.

DETAILED DESCRIPTION OF THE INVENTION

Figure 1:
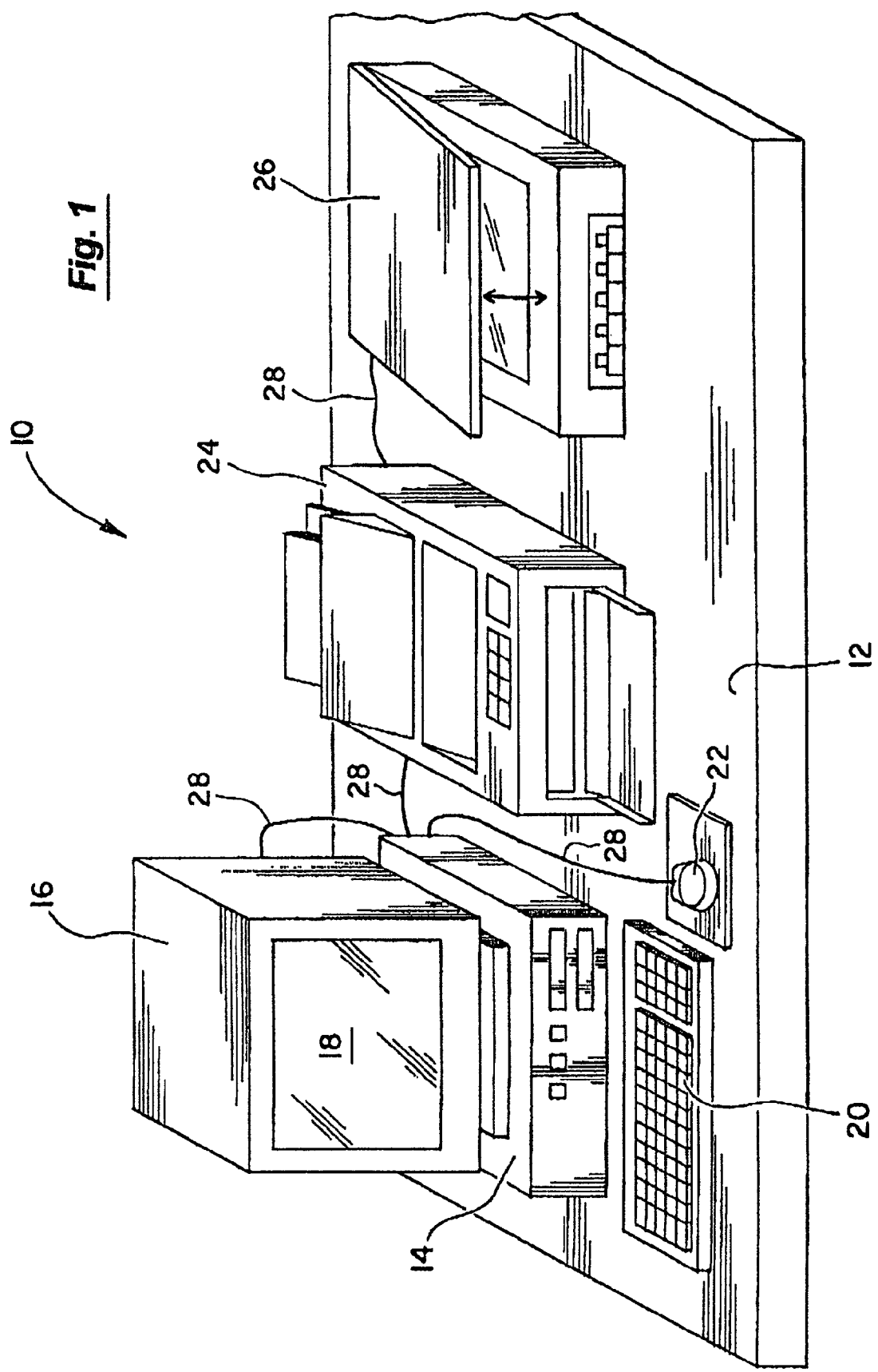
FIG. 1 shows a front perspective view of a desktop upon which a CPU, keyboard, mouse, printer and prior art flatbed scanner rest. A computer monitor unit is shown resting upon the CPU.

FIG. 1 shows an array of computer components 10 on a personal computer user's desktop 12. For illustrative purposes only, this array 10 includes a CPU 14, a monitor 16 having a CRT 18, a keyboard 20, a mouse 22, a printer 24 and a prior art scanner 26. Various cables 28 also are shown interconnecting these components in ways well known to this art.

Figure 2:
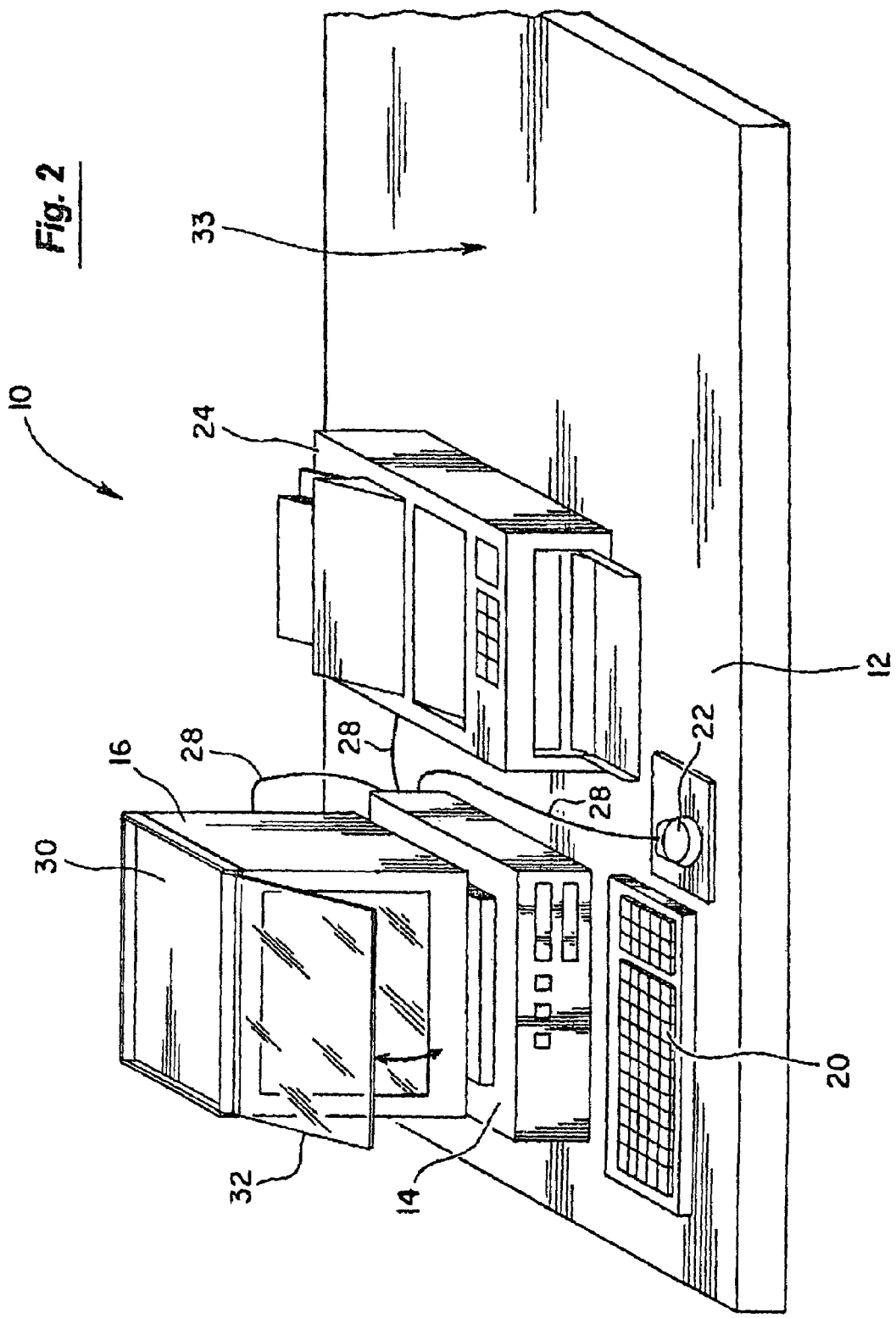
FIG. 2 shows a front perspective view of a desktop wherein the scanner screen device of this patent disclosure is mounted on top of the computer monitor. The flatbed scanner shown in FIG. 1 is no longer present.

FIG. 2 illustrates a scanner screen device 30 of this patent disclosure mounted on top of the monitor 16. A scanner screen component 32 of applicant's device 30 is shown being lowered into position in front of a CRT 18 of said monitor 16. FIG. 2 also illustrates that the desktop space 33 occupied by the prior art scanner 26 in FIG. 1 is now free for other uses by virtue of the fact that applicant's scanner screen device 30 resides on the monitor 16 which, in turn, resides on the CPU 14. Thus, applicant's scanner screen device 30 makes no footprint whatsoever on the desktop 12. Moreover, this still would be the case even if the monitor 16 rested on the desktop 12.

Figure 3:
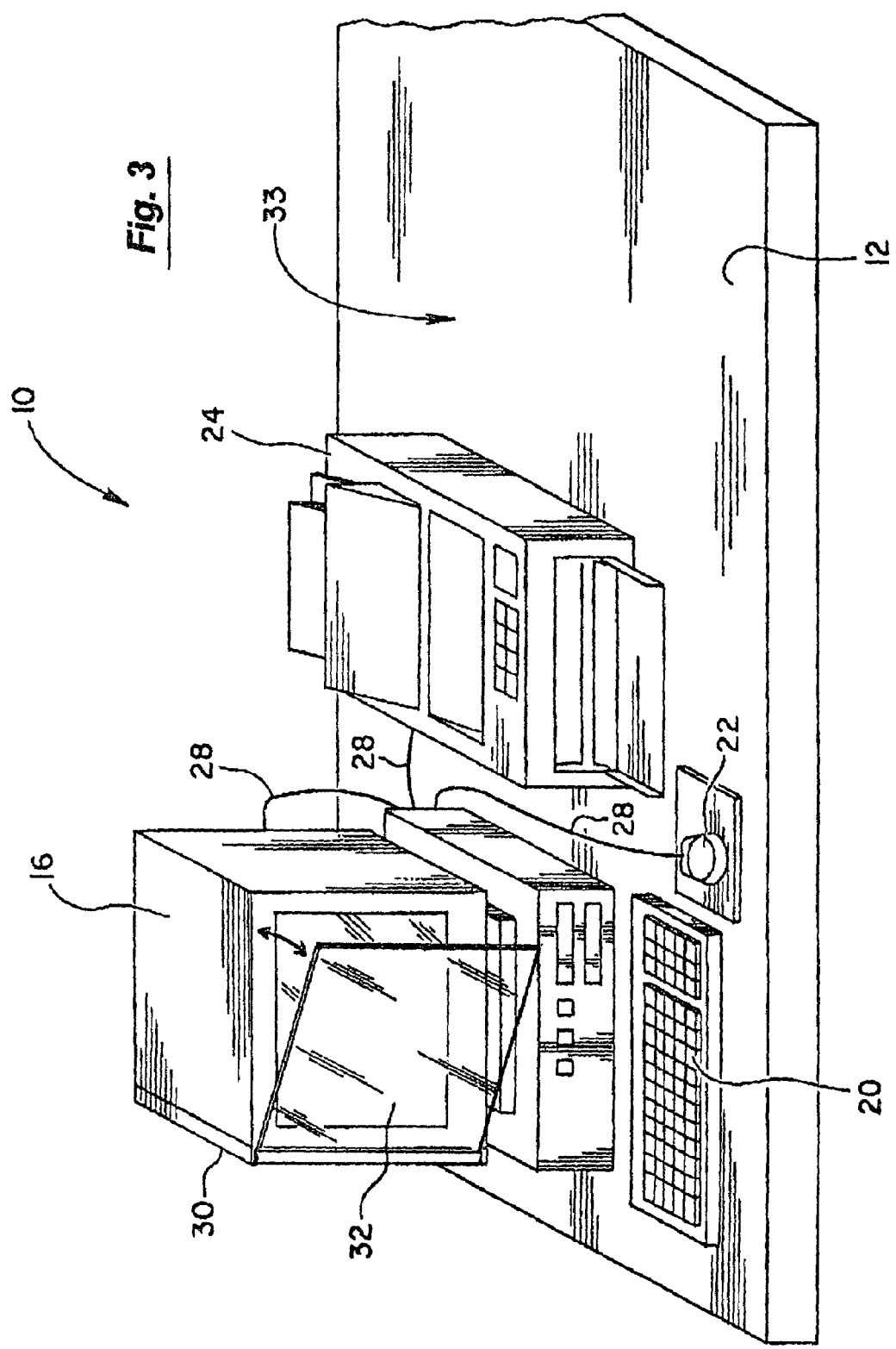
FIG. 3 shows a front perspective view of a desktop wherein applicant's scanner screen device is mounted on the left side of the computer monitor.

FIG. 3 depicts applicant's scanner screen device 30 mounted on, and being positioned for use from, the left side of the monitor 16. It could be used from the right side of the monitor 16 as well.

FIG. 4 is a perspective view of a monitor 16 having applicant's scanner screen device 30 mounted on its top. The scanner screen device 30 is shown having a tray-like and/or frame-like component 34 in which the scanner screen 32 can be readily stowed when said scanner screen 32 is not being used to perform its scanning function. The overall scanner screen device 30 (tray 34 plus scanner screen 32) can be affixed to the monitor 16 by well known connector devices 36, e.g., suction cups, Velcro®, screws or locks.

FIG. 4 also depicts the scanner screen 32 as being hinge mounted from the front end 38 of the scanner device 30 by a hinge mechanism 40 that cooperates with each side of the front end 38 of the tray 34. Hence, the scanner screen 32 is capable of moving in the directions suggested by double headed arrow 42. This hinge mechanism 40 also allows the scanner screen 32 to move between a substantially horizontal orientation (such as that of its stowed position as shown in FIG. 5) to at least a substantially vertical orientation that lies generally parallel to the face of the CRT 18 of the monitor 16. The hinge mechanism 40 that joins the scanner screen 32 and the tray-like and/or frame-like component 34 of the scanner screen device 30 will, preferably, be able to temporarily lock the screen 32 into a vertical position by use of mechanical click lock devices (not shown) known to the lock mechanism construction arts. The screen 32 can be pulled from its horizontally stowed position (see FIG. 5) in the direction generally suggested by arrow 48 in FIG. 4 in order to swing it down into its operating position in front of the CRT 18. The scanner screen 32 is shown having a grid-like, cut out, section 50 whose function is hereinafter more fully described in connection with FIG. 10.

FIG. 4A shows a detail view of one particularly preferred embodiment of this invention wherein the tray-like and/or frame-like component 34 of the scanner screen device 30 will have side pieces such as side piece 44 that respectively contain channels such as channel 44' in which a roller wheel (such as that shown as item 48 in FIG. 4A) is attached to the screen 32 by a connector rod 40. Hence, the connector rod 40, and the wheel 48 attached to it can serve as a hinge mechanism for connecting the screen 32 and the tray 34. Moreover, this roller wheel 48 is guided in channel 44' from the front end 38 of the tray and/or frame 34 to its rear end 39. If the channel-forming sides 44 and 46 are not connected to a bottom sheet such as sheet 49, the holder would be more "frame-like" in nature. On the other hand, if the right side piece 44 were connected to the left side piece 46 by a plate-like member such as that depicted as item 49 in FIG. 4A, then the holder would be more "tray-like" in configuration. This tray-like configuration is somewhat preferred. In any case, the right roller wheel 48 (in conjunction with a comparable left roller wheel positioned in a comparable channel in left side piece 46) serves as both a hinge for placing the screen 32 in front of the CRT 18, as well as a guide for directing the screen 32 to the rear 39 of the holding device 34 and thereby stowing it in the tray-like and/or frame-like component 34.

FIG. 5 shows the screen 32 stowed in the tray-like/frame-like component 34 by virtue of having been pushed in the rearward direction generally suggested by arrow 52 and by virtue of its roller wheel 48 (and its left side counterpart roller wheel, not shown) being rolled rearward in channel 44 until the two roller wheels counter the rear 39 of the tray 34. The screen is thus conveniently stowed for future use. The screen 32 and/or tray 34 also will contain electrical connections (not shown) that provide electrical power to the screen (and, if need be, to the tray) and transmit electrical data from the screen 32 to a computer such as computer 14 of FIG. 2.

FIG. 6 is a cross sectional view of the scanner screen 32 depicted in FIGS. 2 and 3. It is shown positioned in front of a CRT 18 of a computer monitor 14. The scanner screen 32 is of a layered construction. The rear layer 54 of the screen 32 is shown positioned next to the CRT 18. In some of the more preferred modes of operation of this invention, the scanner screen 32 will abut against the face of the CRT 18 during scanning operations. Preferably, the distance 56 between the CRT 18 and the rear layer 54 of the screen 32 can be mechanically adjusted from zero (i.e., scanner screen/CRT abutment) to about one inch by positioning the scanner screen device 30 and/or its hinge mechanism 40 as required. The rear layer 54 of the screen 32 should be made of a translucent material (i.e., a material capable of passing light rays, e.g., light ray 58, produced by a CRT of a computer monitor unit). This rear layer 54 can be made of a rigid plastic sheet material or it can be made of a flexible plastic sheet material that is capable of being bent to some degree (e.g., up to about 45°) without breaking, cracking or permanently deforming. This definition of "flexible" will apply to the other plastic sheet materials used to construct the scanner screen 32.

The next layer in the scanner screen 32 is a document platen layer 60. It too is preferably made of a translucent plastic sheet material that is capable of passing light rays 58 from the CRT 18 to an object 62 to be imaged (e.g., a scan line portion of such an object). The platen layer 60 also should be capable of passing reflected rays 58' from the object 62 to a photodetector 64. The plastic sheet material from which the platen layer 60 is made can be rigid or flexible (capable of being bent to 45° without being damaged) in nature. Indeed, the material from which the platen layer 60 is made can be the same material from which the rear layer 54 is made. The distance between the platen layer 60 and the rear layer 54 should be such that photodetectors (such as photodetector 64) positioned between these two layers (60 and 54) can be placed in focus with light rays 58' reflected from the object being imaged 62. FIG. 6 shows such an object 62 positioned to the right of the platen layer 60.

The next layer of the scanner screen 32 of this patent disclosure is its foremost or lid layer 66. This lid layer 66 can likewise be made of a rigid or flexible plastic material. It can also be made of a translucent plastic material or an opaque plastic material. All three of these layers (54, 60 and 66) can be held in fixed relationships with respect to each other by virtue of being attached (e.g., by glue, fusing or mechanical connecting devices) to a common base 68 and to common sides (not shown). In the alternative, the lid layer 66 can be hingedly mounted to the remainder of the scanner screen 32. For example, the bottom of the lid layer 66 could be hingedly mounted to the base 68. Preferably the screen 32 will not be more than about one inch thick. In some of the most preferred embodiments of this invention, the distance between the outside of rear layer 54 and the outside of lid layer 66 will be less than one half inch.

FIG. 6 shows the platen layer 60 and lid layer 66 affixed to a base 68 in a manner such that a space 70 is defined between the platen layer 60 and the lid layer 66. This space 70 should be wide enough to receive a sheet-like object 72 such as a piece of paper that contains printed information to be scanned. The space 70 should be narrow enough to hold a sheet of paper in a generally flat, upright orientation such as that suggested in FIG. 6. The design of the scanner screen 32 should be narrow enough that the sheet 72 is, preferably, placed in physical contact with the platen layer 60. The space 70 can be relatively wider if the lid layer 66 is made of a more flexible plastic material. The flexible nature of the material from which the lid layer 66 is made can be such that it may be biased inward to hold a sheet 72 upright against the platen 60, or expand outward to accommodate a sheet 72 that is thicker than a sheet of paper (e.g., a sheet up to about one half inch thick). In any case, the sheet-like object 72, whatever its thickness, can be placed in, and taken out of, space 70 at the top of the scanner screen 32 in the manner generally suggested by double headed arrow 74. The sheet-like object 72 also could be loaded into and removed from space 70 from a side of the screen 32 in a similar manner. And, as was previously noted, the lid layer 66 may be hingedly attached to the remainder of the scanner screen to facilitate loading the sheet 72 into the scanner screen 32 and then taking it out.

FIG. 6 also shows an array of channel-shaped photoshields 74, 74A, 74B, etc. located between the rear layer 54 and the platen layer 60. Each of these photoshields is shown holding a photodetector. For example, channel-shaped photoshield 74A is shown holding photodetector 64A, and so on. Thus a photodetector and a shield that partially surrounds it form a photodetector/shield unit. An array of such photodetectors 64, 64A, 64B, etc. is connected to a computer such as the desktop computer 14 shown in FIGS. 2 and 3 in ways hereinafter more fully described. The photoshields 74, 74A, 74B, etc. serve to protect their respective photodetectors 64, 64A, 64B, etc. from certain rays of light 76A, 76B, etc. emitted from the CRT 18. Such light rays will impinge on the rear side of the photoshields and be absorbed and/or scattered. These photoshields are shown regularly spaced from each other. One such space is labeled by item number 78 in FIG. 6. These spaces allow certain rays of light (e.g., light ray 58) emitted from the CRT 18 to pass between neighboring photoshields in the manner generally suggested by the light path followed by ray 58. The distance 78 between the shields 74, 74A, etc. will control the amount and angle of those light rays that pass through a given spacing (such as spacing 78) in an array of such spacings.

One such ray 58 is shown passing through the body of the platen layer 60 and impinging on an object 62 to be scanned.

The object 62 gives off a reflected ray 58'. This reflected ray 58' passes through platen layer 60 and falls upon a photodetector 64. The photodetector 64 transduces the intensity of the reflected ray 58' into a data signal such as a voltage signal. Signals from an array of such photodetectors 64, 64A, 64B, etc. are collected in ways known to the electrophotoscanning arts and then sent to a computer. Preferably, the computer is associated with the same CRT 18 employed by the scanner screen 32 as its light source. This relationship is suggested by line 84 in FIG. 6.

Thus, in its most fundamental aspects, the external light source-employing scanner of this patent disclosure comprises a scanner screen holder and a scanner screen having: (1) a rear layer of translucent plastic, (2) an array of photodetector/shield units having light-passing slots between neighboring photodetector/photoshield units such that light rays pass through a given slot in the array, impinge upon an object, reflect from said object to a photodetector and converted to machine-readable data signals, (3) a platen layer of translucent plastic and (4) a lid layer of plastic that defines an object holding space (e.g., a space for holding a sheet of paper) between the platen layer and the lid layer.

FIG. 7 depicts a screen 32A that is constructed in the same manner that scanner screen 32 of FIG. 6 is constructed. The screen in FIG. 7 is, however, shown having a somewhat curved configuration. This curvature is shown coinciding with the curvature of a CRT 18A in FIG. 7. An abutting relationship between the screen 32A and the CRT 18A is preferred when the external light source is a curved tube. The curvature of screen 32A in FIG. 7 also suggests that the scanner screens of this patent disclosure can be made of layers of flexible plastic materials. Hence, they can be bent to some degree (e.g., up to about 45°) without being damaged. This flexible quality is useful in mounting, positioning and stowing the screen 32 in the storage tray and/or frame 34 shown in FIG. 5.

Figure 8:
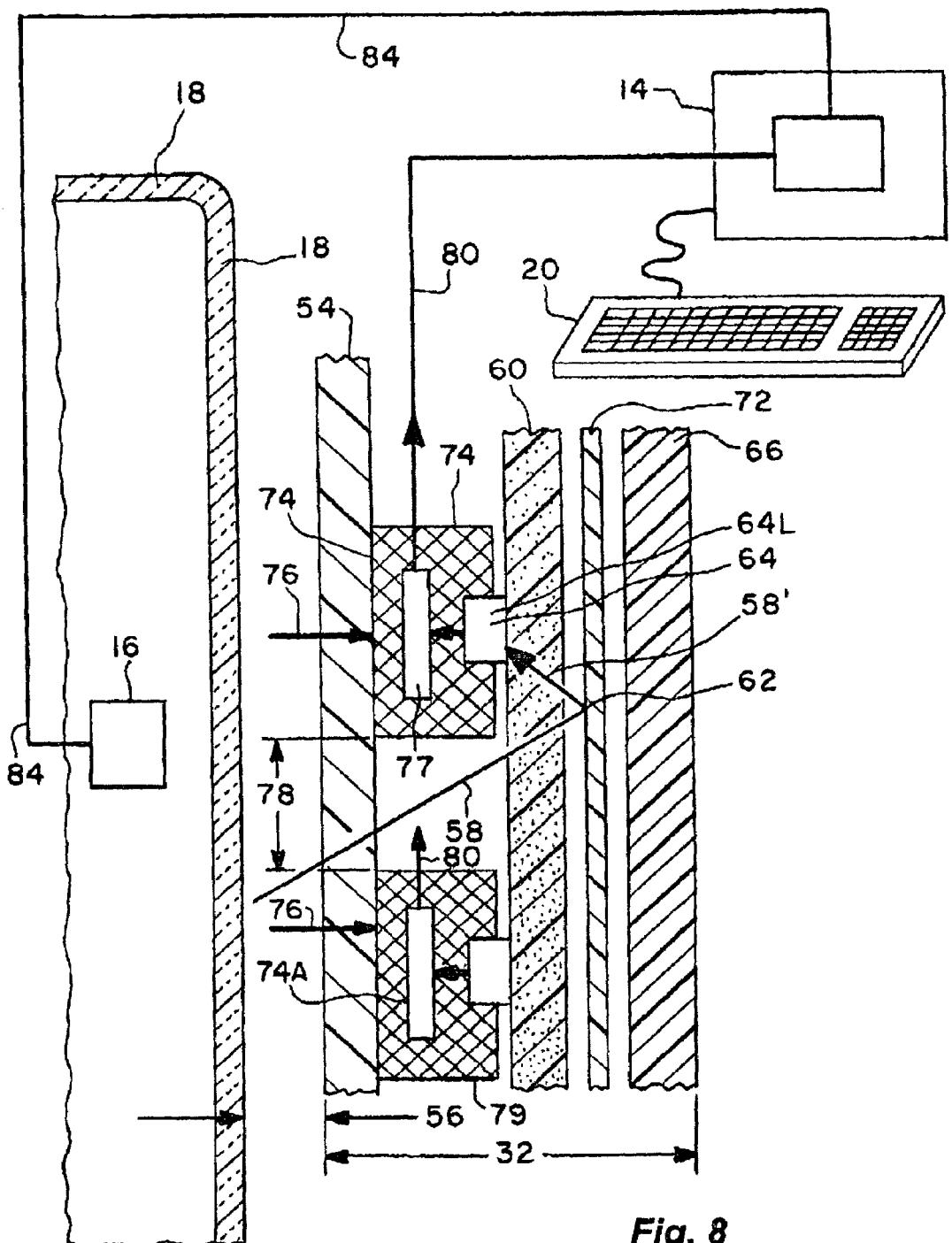
FIG. 8 shows a cross sectional view of the scanner screen as a ray of light passes through a preferred optical path in the scanner screen.

FIG. 8 is an enlarged view of a portion of the scanner screen 32 shown in FIG. 6. It shows a representative light ray 58 from an external light source (such as CRT 18) being used to illuminate a scan line portion of an object 62 such as a portion of a piece of paper 72 having printed information to be scanned. The CRT 18 will preferably emit light over an area wide enough to entirely illuminate an object that is generally the size of a sheet of commercially available paper (e.g., 8½×11 inches), and thus, illuminate an appropriately sized scan line portion of such an object. In any case, FIG. 8 shows light ray 58 passing through a space 78 between photoshields 74 and 74A. This ray 58 is reflected from object 62 in a reflected ray 58' that falls on a generalized photodetector 64. The photodetector 64 may be used in its own right to generate voltage signals based upon the intensity of the light it receives, or it may further comprise various other optical and/or photoelectric devices. For example, an optical device 64L (64 lens) can be located at the termination of the light path 58'. It can serve to focus the reflected light 58' onto a photoelectric device 77.

FIG. 8 also shows that other rays (e.g., ray 76) emitted from the CRT 18 will pass through the rear layer 54, but then will be blocked by a photoshield (such as photoshield 74) in an array of such photoshields. Again, this is done to protect a photodetector, e.g., photodetector 64, from rays other than information carrying rays such as reflected ray 58'. To this end, the photoshields 74, 74A, 74B, etc. preferably will have a channel-like cross sectional configuration in which a given photodetector resides. Hence the sides of such channels e.g., side 79 of shield 74A, will serve to protect a photodetector from flared or scattered light.

Figure 9:
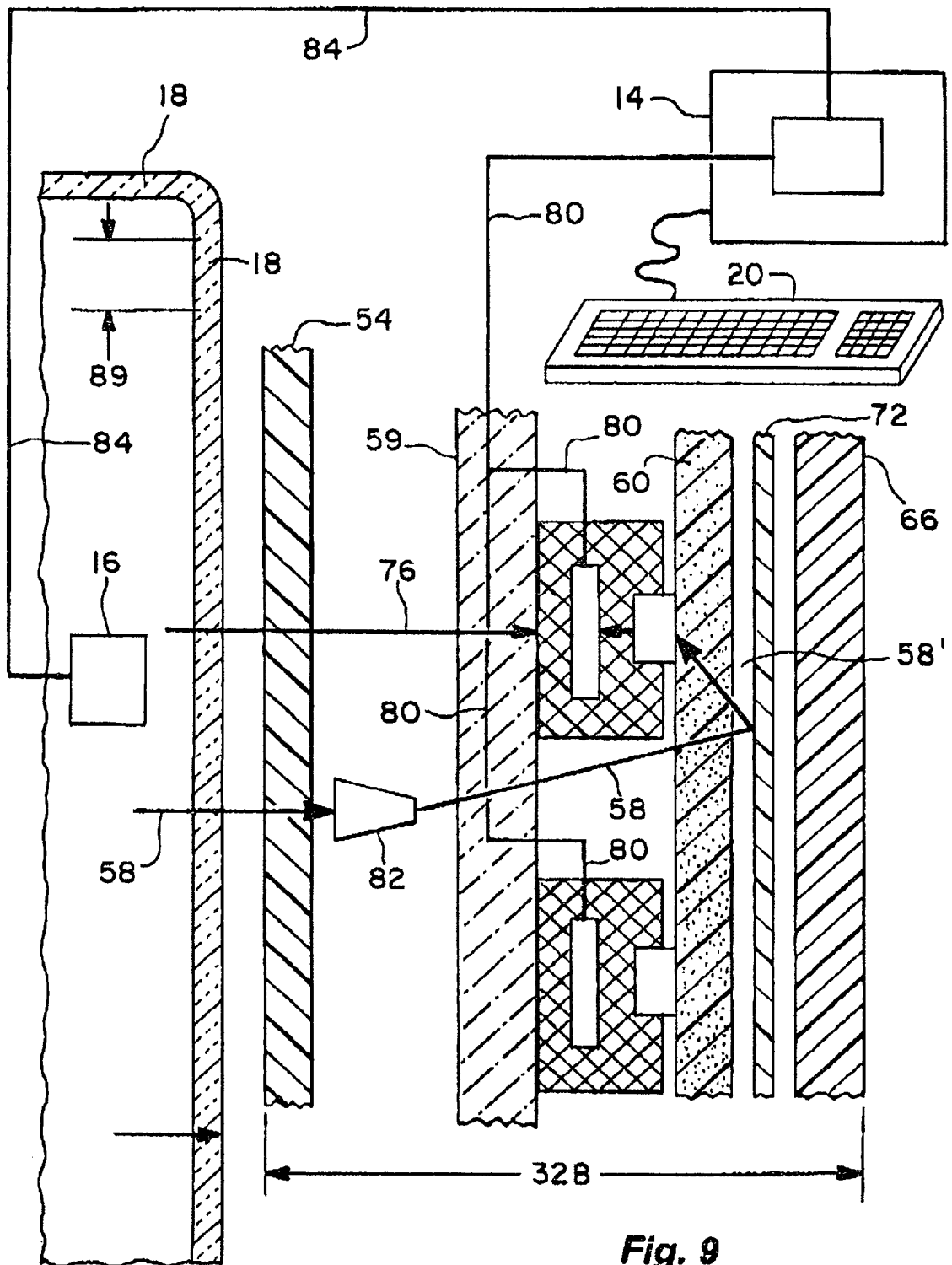
FIG. 9 shows a cross sectional view of the scanner screen as a ray of light passes through another preferred optical path that includes passage through a lens.

FIG. 9 depicts another embodiment of this invention wherein a scanner screen 32B also includes an array of lenses, one of which (lens 82) is shown located between the rear layer 54 and the platen layer 60. This embodiment also includes use of an electrically conductive fourth layer 59 in the scanner screen 32B. It's electrical function will be discussed with regard to FIG. 10. In any case, light 58 emitted by the CRT 18 will pass through the transparent material of the rear layer 54, through the lens 82, through the electrically conductive layer 59, and then be focused on the object 62 by means of such a lens 82. The fourth layer 59 should therefore be made of translucent, plastic material 59. The translucent material (e.g., Mylar®) from which layer 59 is made also should have the ability to pass the direct light rays 58 and pass the reflected light rays 58' as well as pick up and direct a system of electrical signals from the array of photodetectors (64, 64A, 64B, etc.). In some preferred embodiments of this invention, the translucent layer (e.g., Mylar®) may be provided electrical circuitry. For example, those skilled in this art will appreciate that indium tin oxide is a transparent conductor material. Hence circuits of indium tin oxide could be placed on a transparent layer of material such as Mylar®.

The data generated by photodetector devices 64, 64A, 64B, etc. will be processed in various ways known to this art. For example, the data generated by such a photodetector 64 will be sent, e.g., via line 80, to an external CPU such as the CPU 14 depicted in FIG. 2. The CPU 14 will be programmed to process data transmitted from the array of photodetector devices in the screen 32. The external CPU 14 also may be used to store unprocessed or processed data for use at a later time. In addition to processing image data, the external CPU 14 will preferably control the scanning operation as well. This control will normally include interfacing with the user and then controlling the external light source produced by the CRT 18. Such user interfaces may be accomplished via a keyboard 20 (or mouse) connected to the CPU 14. The external CPU 14 also can serve as the source of electric power to the scanner screen device 30 as if it were a peripheral device of said CPU 14.

When the CRT 18 of a monitor 16 also is connected to the external computer 14 (e.g., via line 84), the user also may control the spectrum of light emitted by the CRT 18. For example, software within the external computer 14, controlled by the user, may determine the color of light emitted by the CRT 18, and thus, the color of light used to illuminate the object 62. The spectrum of light emitted by the CRT 18 may be selected depending upon the requirements of a given scanning application. For monochrome scanning, a white or green light source may be selected for emission from the CRT 18. For polychrome scanning, the CRT 18 may be called upon to emit a full spectrum of light (e.g., red, green, and blue) either simultaneously or separately upon separate scans. When the object 62 is illuminated by separate colors on separate scans, the computer 14 may be used to converge the images generated by each scan into a single scan. This can be done with software well known to the electrophotography arts.

The CRT 18 may also have a section devoted to a menu screen (not shown). The menu screen may display information required to operate the scanner screen 32. This information also may include prompts to start the scanning operation, text of scanned data, and error messages. Generation of the menu screen and any text contained within the menu screen may be accomplished by software located in the external computer 14. Such a menu screen should be located far enough from the area on the CRT 18 used by the scanner screen 32 so that the scanner screen device 32 will not collect extraneous light from the information being displayed on the menu screen. CRT/user interfacing also may be aided by virtue of the fact that the scanner screen user can simply look over the top edge of the screen 32 and view a screen portion 89 dedicated to showing certain portions (e.g., the last few lines scanned) of an object in the process of being scanned.

Figure 10:
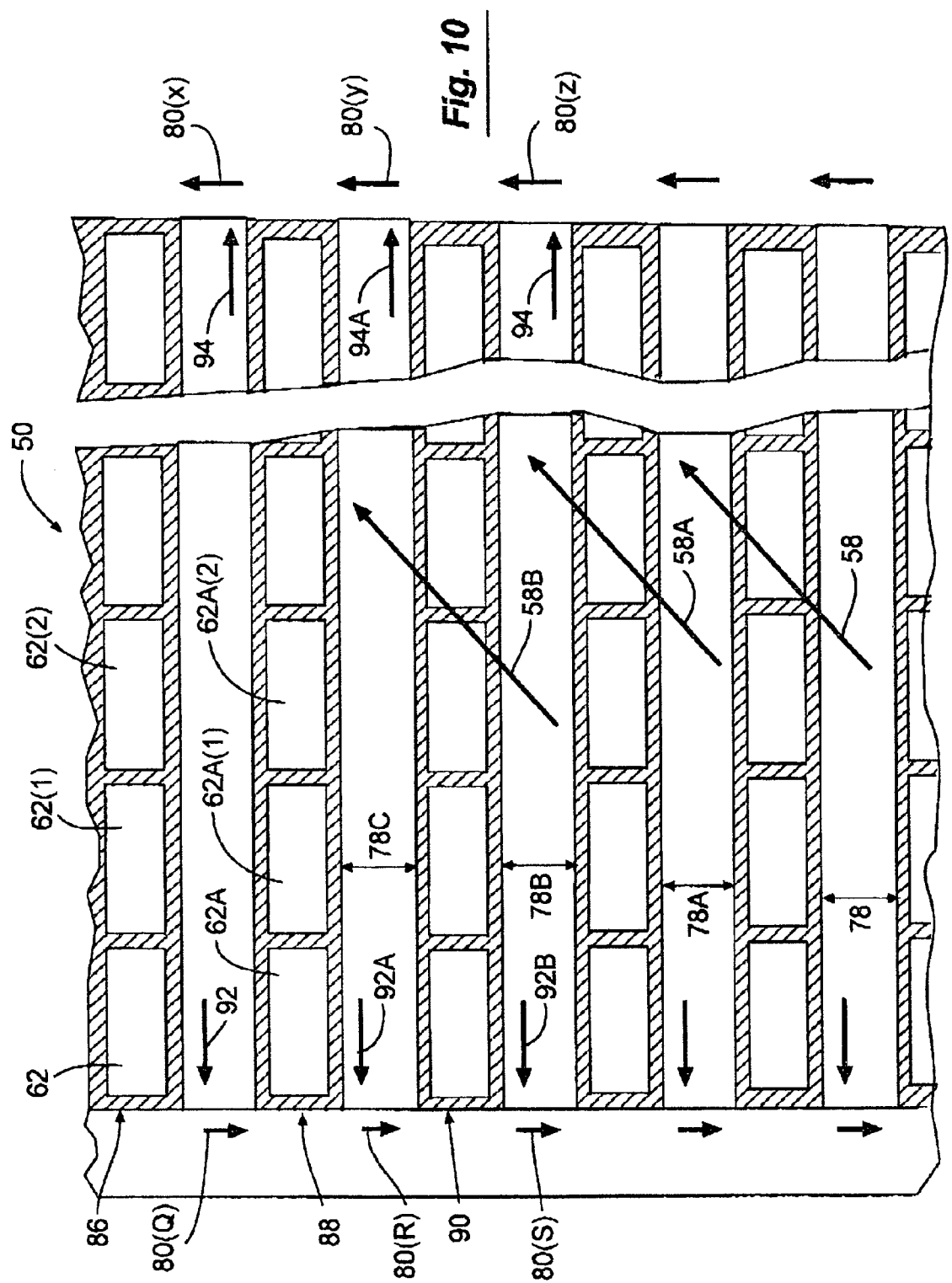
FIG. 10 shows an exploded front view of a layer portion of applicant's scanner screen.

FIG. 10 is an enlargement of that cut out portion 50 of the scanner screen 32 shown in FIG. 4. It depicts an array of photodetector/shield units. By way of example, a first row 86 of such an array is shown containing a series of photodetectors 62, 62(1), 62(2), etc. A second row 88 is shown containing another row of photodetectors 62A, 62A(1), 62A(2), etc. These rows 86, 88, 90, etc. are shown separated by distances 78, 78A, 78B, 78C, etc. that are substantially uniform. Representative rays of light 58, 58A, 58B are shown passing through some of these spaces, e.g., spaces 78, 78A, 78B. These rays travel in paths similar to those depicted in FIGS. 6, 8 and 9.

FIG. 10 also is shown provided with various sets of arrows: (1) 80(Q), 80(R), 80(S); (2) 92, 92A, 92B; (3) 80(X), 80(Y), 80(Z) and (4) 94, 94A, 94B. These arrows are intended to depict the flow of voltage signals generated by the photodetectors 62, 62(1), 62A, 62A(1), etc. These voltage signals can be made to flow along prescribed paths by electrical circuits in the screen (not shown). This array of electrical signals is then gathered and processed in ways known to this art. Again, such signals can be sent to the computer 14 shown in FIG. 8 via line 80. To this end, the array of photodetectors shown in FIG. 10 also can be mounted upon and electrically connected to a layer or sheet of translucent material that is also capable of picking up and properly conveying the electrical signals shown in FIG. 10 by well known methods. One of these methods is through the use of a transparent conducting material such as indium tin oxide. Thus, this layer could, for example, be made of a sheet of Mylar® having indium tin oxide circuitry placed on its surface. A layer of this transparent electrically conductive material is depicted in FIG. 9 as item 59. Such a layer 59 also is particularly useful in systematically "purging" or "flushing" the photosensors by grounding them. Such photoexcite/purging operations also can be controlled by a program used in the computer 14 that controls the scan line emission process.

The foregoing description of the present invention has been presented for purposes of illustration and description. It is not intended to be exhaustive or to limit the invention to the precise forms disclosed. Other modifications and variations may be possible in light of the above teachings. For example, an embodiment wherein the object to be scanned is a sheet of paper was chosen and described in order to best explain the principles of the invention and its most common practical applications and thereby enable others skilled in the art to utilize this invention in various ways—many of which are not specifically disclosed herein. It is therefore intended that the appended claims be construed to include other alternative embodiments of the invention except insofar as they are limited by the prior art.

What is claimed is:

1. An apparatus comprising an external light source-employing scanner, the scanner comprising:
    a scanner screen holder; and
    a scanner screen having:
        a rear layer of translucent plastic;
        an array of photodetector/shield units having light-passing slots between neighboring photodetector/photoshield units such that light rays from an external source pass through a given slot in the array, impinge upon an object, and reflect from said object to a photodetector;
        a platen layer of translucent plastic; and
        a lid layer of plastic that defines an object holding space between the platen layer and the lid layer, the lid layer and platen layer spaced apart to enable the object to be moved into and out of the space on at least one side of the scanner screen.

2. The apparatus of claim 1 further comprising a processor, wherein said processor is external to said scanner.

3. The apparatus of claim 1, further comprising a CRT and a computer, wherein the CRT is employed as the external source and is electrically connected to the computer that is electrically connected to the scanner screen.

4. The apparatus of claim 1 further comprising a lens device for concentrating light from said external light source onto said object.

5. The apparatus of claim 1, wherein the scanner screen further comprises a fourth layer of plastic material that is capable of passing light rays and also capable of passing electrical signals.

6. The apparatus of claim 1, wherein the scanner screen further comprises a layer made of Mylar® having an electrical circuit on its surface and wherein said electrical circuit is made of a transparent conducting material.

7. The apparatus of claim 1 further comprising electrical circuitry for generating a plurality of color spectral components with said light source.

8. The apparatus of claim 1, further comprising a CRT associated with the scanner screen to provide a menu screen.

9. The apparatus of claim 1 wherein the lid layer is hingedly attached to the scanner screen.

10. The apparatus of claim 1 wherein the scanner screen further comprises a mechanical connector for securing said screen to a computer monitor.

11. The apparatus of claim 1 wherein the scanner screen is connected to the scanner screen holder by a hinge mechanism.

12. The apparatus of claim 1 wherein said scanner screen has a flat surface.

13. The apparatus of claim 1 wherein said scanner screen has a curved surface.

14. The apparatus of claim 1 wherein the scanner screen holder positions the scanner screen in a vertical position in front of a CRT.

15. The apparatus of claim 1 wherein the scanner screen has a slot that serves to hold a sheet of paper in a vertical orientation in front of a CRT.

16. The apparatus of claim 1 wherein the rear layer, platen layer and lid layer are all made of a flexible plastic material.

17. An external light source-employing scanner comprising:
    a scanner screen holder; and
    a scanner screen having:
        a rear layer of translucent plastic;
        an array of photodetector/shield units having light-passing slots between neighboring photodetector/photoshield units such that light rays from an external source pass through a given slot in the array, impinge upon an object, and reflect from said object to a photodetector;
        a platen layer of translucent plastic; and
        a lid layer of plastic that defines an object holding space between the platen layer and the lid layer, wherein a shield component of a photodetector/shield unit has a channel configuration in which a photodetector resides.

18. An apparatus comprising:
an external light source-employing scanner comprising:
   a scanner screen holder; and
   a scanner screen having:
      a rear layer of translucent plastic;
      an array of photodetector/shield units having light-passing slots between neighboring photodetector/photoshield units such that light rays from an external source pass through a given slot in the array, impinge upon an object, and reflect from said object to a photodetector;
      a platen layer of translucent plastic;
      a lid layer of plastic that defines an object holding space between the platen layer and the lid layer; and
   electrical circuitry for adjusting said light source to provide a desired light color.

19. The apparatus of claim 18, wherein the electrical circuitry is activated in response to selection of a user interface element displayed in a display.

20. An external light source-employing scanner comprising:
   a scanner screen holder; and
   a scanner screen having:
      a rear layer of translucent plastic;
      an array of photodetector/shield units having light-passing slots between neighboring photodetector/photoshield units such that light rays from an external source pass through a given slot in the array, impinge upon an object, and reflect from said object to a photodetector;
      a platen layer of translucent plastic; and
      a lid layer of plastic that defines an object holding space between the platen layer and the lid layer,
      wherein the scanner screen holder has channels in which a roller wheel can turn and thereby guide the scanner screen into and out of the scanner screen holder.

21. An external light source-employing scanner comprising:
   a scanner screen holder; and
   a scanner screen having:
      a rear layer of translucent plastic;
      an array of photodetector/shield units having light-passing slots between neighboring photodetector/photoshield units such that light rays from an external source pass through a given slot in the array, impinge upon an object, and reflect from said object to a photodetector;
      a platen layer of translucent plastic; and
      a lid layer of plastic that defines an object holding space between the platen layer and the lid layer,
      wherein the rear layer, platen layer and lid layer are all made of rigid plastic materials.

22. A scanner, comprising:
   a holder mountable to a unit having an external light source; and
   a scanner screen comprising:
      a first layer of translucent material;
      a second layer of translucent material;
      an array of photodetectors between the first and second layers;
      a third layer spaced apart from the first layer to provide space for receiving an object to be scanned,
      wherein the scanner screen has a first position with respect to the holder in which the scanner screen is positioned to receive light from the external light source, and
      wherein the scanner screen is moveable with respect to the holder from the first position to a second position in which the scanner screen is stowed in the holder.

23. The scanner of claim 22, wherein the scanner screen is attached to the holder by at least one roller wheel to enable relative movement between the scanner screen and the holder.

24. The scanner of claim 23, wherein the scanner screen is hingedly attached to the holder by the at least one roller wheel.

25. The scanner of claim 22, wherein the third layer is moveably mounted with respect to the second layer to facilitate loading and removal of the object in the space.

26. A method of using a scanner with respect to an external light source, comprising:
   mounting the scanner to a unit containing the external light source, wherein the scanner has a holder and a scanner screen;
   moving the scanner screen from a stowed position in the holder to a second position in which the scanner screen is positioned to receive light from the external light source;
   loading an object to be scanned into a slot in the scanner; and
   activating the scanner to scan the object.

27. The method of claim 26, wherein the unit comprises a computer having a display that provides the external light source,
   wherein activating the scanner is in response to activation of a user interface element displayed by the display.

* * * * *